United States Patent [19]

Lonardi et al.

[11] Patent Number: 4,668,253
[45] Date of Patent: May 26, 1987

[54] APPARATUS FOR THE PROCESSING AND SCRUBBING OF GAS ENTRAINED WITH PARTICULATE MATTER

[76] Inventors: Emile Lonardi, 30 rue de Schouweiler, Bascharage; Louis Schmit, 39 rue Théodore Eberhardt, Luxembourg, both of Luxembourg

[21] Appl. No.: 893,223

[22] Filed: Aug. 5, 1986

Related U.S. Application Data

[63] Continuation of Ser. No. 707,052, Mar. 1, 1985, abandoned.

[30] Foreign Application Priority Data

Mar. 2, 1984 [LU] Luxembourg .............................. 85236

[51] Int. Cl.$^4$ .............................................. B01D 46/04
[52] U.S. Cl. ......................................... 55/215; 55/217; 55/267; 55/303; 55/341 PC; 75/25; 266/157
[58] Field of Search ................... 55/302, 303, 341 PC, 55/226, 227, 341 MC, 213, 214, 215, 217, 267; 75/25; 266/157

[56] References Cited

U.S. PATENT DOCUMENTS

| | | | |
|---|---|---|---|
| 3,541,764 | 11/1970 | Astrom ................................. | 55/302 |
| 3,635,003 | 1/1972 | Schindling et al. ............ | 266/157 X |
| 3,735,566 | 5/1973 | Loliwala ........................... | 55/302 X |
| 3,832,005 | 8/1974 | Hek .................................... | 55/302 X |
| 3,990,886 | 11/1976 | Sumter ................................ | 75/25 X |
| 3,999,968 | 12/1976 | Brookman ........................ | 55/303 X |
| 4,234,335 | 11/1980 | Weissert et al. .................. | 55/213 X |
| 4,398,931 | 8/1983 | Shevlin ............................. | 55/302 X |

*Primary Examiner*—Charles Hart
*Attorney, Agent, or Firm*—Fishman & Dionne

[57] ABSTRACT

An apparatus for the processing and scrubbing of contaminated gases i.e., gases entrained with particulate matter, is presented. The apparatus comprises a primary dust removal unit which receives a descending gas pipeline originating from a generator or source of contaminated gases. This primary dust removal unit acts to precipitate the larger solid particles from the contaminated gas via gravity and/or inertia to define semi-scrubbed gas. A plurality of scrubbers are provided within the primary dust removal unit to form the forced scrubbing of the semi-scrubbed gases from the primary unit. Each of these scrubbers contain a series of bag filters which are traversed from bottom to top by the semi-scrubbed gases. The scrubbers also include means for monitoring the temperature of the gases at different points in their passage and means for cooling or heating the gases in order to maintain their temperature within predetermined operational limits.

16 Claims, 6 Drawing Figures

APPARATUS FOR THE PROCESSING AND SCRUBBING OF GAS ENTRAINED WITH PARTICULATE MATTER

This application is a continuation of application Ser. No. 707,052 filed Mar. 1, 1985 and now abandoned.

BACKGROUND OF THE INVENTION

This invention relates to an apparatus for the processing and scrubbing of contaminated gases i.e., gas entrained with particulate matter. More particularly, this invention relates to an apparatus comprising a primary dust removal unit which receives a descending gas pipeline originating from a generator or source of contaminated gases. This primary dust removal unit acts to precipitate the larger solid particles from the contaminated gas via gravity and/or inertia to form semi-scrubbed gas. A plurality of scrubbers are provided within the primary dust removal unit to effect the forced scrubbing of the semi-scrubbed gases from the primary unit. Each of these scrubbers contain a series of bag filters which are traversed from bottom to top by the semi-scrubbed gases. The scrubbers also include means for monitoring the temperature of the gases at different points in their passage and means for cooling or heating the gases in order to maintain their temperature within predetermined operational limits.

While not being limited thereto in its utility, the description herein will refer to an apparatus for the processing and scrubbing of contaminated gases which is associated with a high furnace. It should be understood that the crude gases produced in such a high furnace are discharged therefrom at variable and relatively high temperatures and pressures as compared to the ambient atmosphere; and are also laden or entrained with dusts and other solid particulate matter. It will be appreciated that the apparatus of the present invention is also suitable for use in conjunction with any other source of contaminated gases having solid particles entrained therein.

It is well known that contaminated gases, such as those obtained from a high furnace, contain combustible components therein. Accordingly, such contaminated gases are well suited for use as a heating gas. However, before these contaminated gases may be practically used in a distribution network as a heating gas, they must be cooled, reduced in pressure, cleaned and scrubbed. These processing operations are usually performed in a gas processing installation which incorporates a primary dust removal unit (generally known as a "dust bag"); which may possibly be associated with a cyclone. These gas processing installations usually further include a forced scrubbing unit which consists of a damp washer; the damp washer being responsible for the cooling and decompression of the gases.

Although such gas processing has enabled the reusable components of the contaminated gases to be recovered (in the form of a heating gas), such prior art processing installations include may deficiencies with regard to the recovery of accumulated energy in the combustible gases in the form of heat and pressure. This loss of energy (loss of inherent heat and pressure) is due in part, to the damp washing which can not be carried out without the dissipation of a large portion of the energy inherent in the contaminated gases.

As energy conservation and energy efficiency has gained increasingly greater importance in manufacturing processing, a scrubbing technique has recently been provided which acts to preclude the above discussed loss of inherent heat and pressure and thereby enable a large portion of the energy in the contaminated gases to be recovered despite the scrubbing and other gas processing steps. This new energy efficient gas processing technique is described in German Patent Document No. DE-Al-3,129,812 wherein a process is disclosed for replacing the damp washing by a final scrubbing. This final scrubbing is performed dry and does not involve simultaneous dissipation of the heat and pressure as in the prior art damp washing process. In other words, in the process disclosed in the German Patent Document, the final scrubbing phase has been separated from the decompression and cooling phase, so that the energy derived from the decompression and cooling phases may be efficiently utilized. Accordingly, the process described in the German Patent document attempts to provide a maximum recovery of the energy available within gases emitted from a contaminated gas source.

While suitable for its intended purposes, the gas processing apparatus described in the above discussed German Patent Document for carrying out this energy efficient scrubbing process nevertheless has a number of disadvantages and deficiencies which are discussed in greater detail hereinbelow.

SUMMARY OF THE INVENTION

The above discussed and other problems of the prior art are overcome or substantially reduced by the new and improved contaminated gas processing apparatus of the present invention. In accordance with the present invention, a plurality of individual scrubbing units are mounted on the walls of the primary dust removal unit and are connected at their respective top portions thereof to a circular collector which acts to collect the scrubbed gases. Each of these individual scrubbing units contains a series of bag filters which are traversed from bottom to top by the gases to be scrubbed. An important feature of the present invention is that both the solid particles precipitated during the primary dust removal and those solid particles retained in the plurality of bag filters are all discharged through a hopper which forms the base of the primary dust removal unit and the scrubbers. In a first embodiment of the present invention, the scrubbers are integrated into the wall of the primary dust removal unit. In accordance with the second embodiment of the present invention, the scrubbers are hung on the wall of the primary dust removal unit and are each connected to the latter by a tubular element for the transfer of the semi-scrubbed gases between the primary unit and each scrubber; and by a conduit for discharging the scrubbing residues towards the base of the primary unit.

The above discussed and other advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES;

FIG. 2A is a cross-sectional elevation view along the line A—A of FIG. 2;

DESCRIPTION OF THE PREFERRED EMBODIMENT

Figure 1:
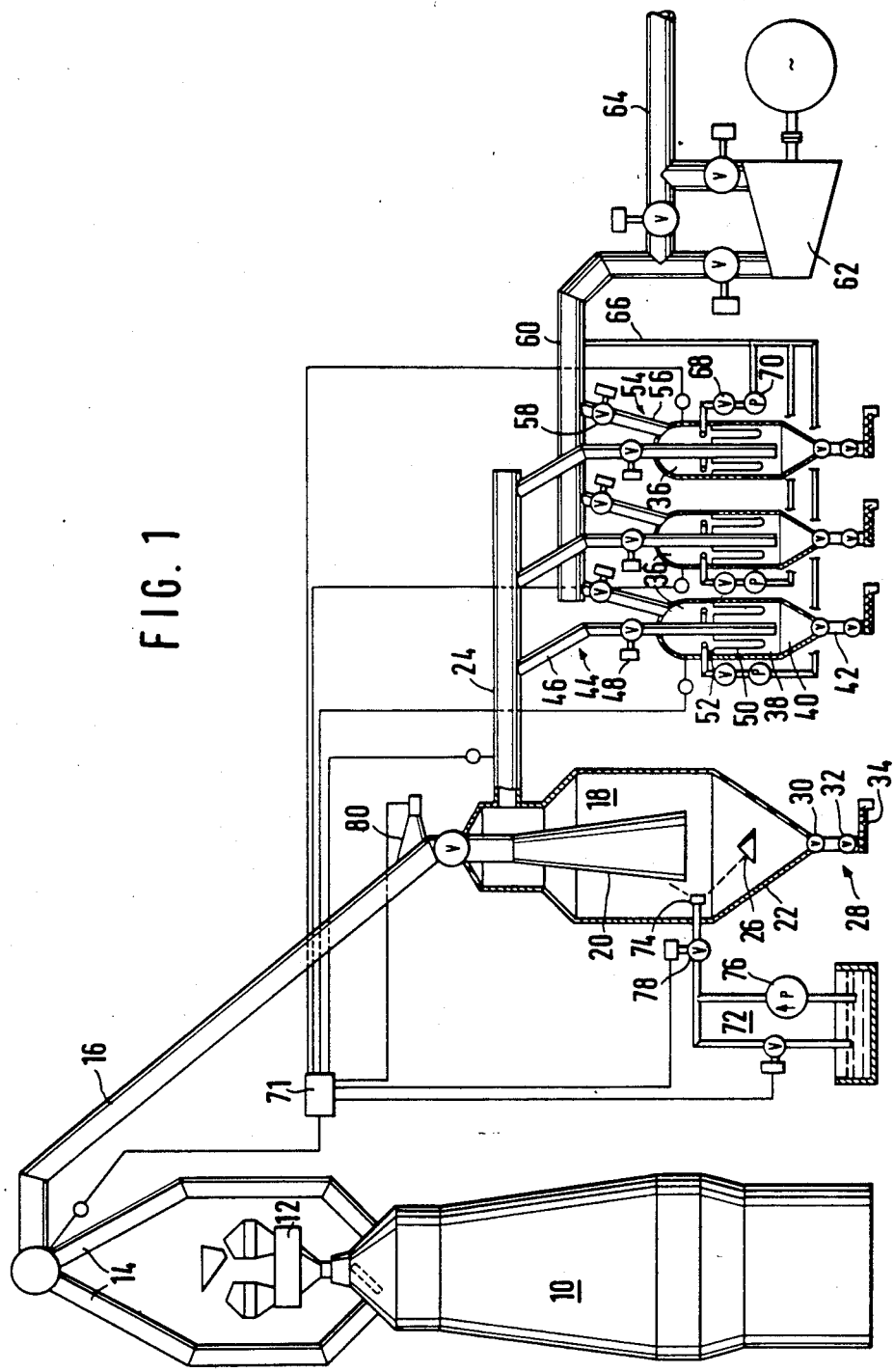
FIG. 1 is an elevation view, partly in cross-section, of a contaminated gas processing and scrubbing apparatus in accordance with the prior art.

Referring first to FIG. 1, a generator or source of crude or contaminated gases is shown generally at 10. While the source of crude gas may consist of any crude gas source, for the purposes of the following description, crude source 10 is a high furnace used in metal processing which is provided with an apparatus for supplying and distributing charge material therein identified at 12. It will be appreciated that high furnace 10 generates crude gases under high pressure and temperature by the reduction processes taking place therein. These crude gases are laden or entrained with dust or larger solid particles. The entrained crude gases are released through the pipelines 14 and collected in a collector 16 which descends into a primary dust removal unit 18. Primary dust removal unit 18 generally consists of a sealed enclosure, the base of which includes a conical hopper 22 which collects particles and dust. Collector 16 descends into dust removal unit 18 whereupon it broadens or diverges (at 20) in the central region of the enclosure interior. It will be appreciated that the upper portion of unit 18 is connected to a conduit or pipeline 24 for discharging the semi-scrubbed gases.

As a result of the diverging section 20 of collector 16 within enclosure 18, the speed of the crude gas is reduced from a high speed, for example on the order of ten meters per second, to a lower speed, for example on the order of one meter per second. The effect of this deceleration of the gases along with the diversion of the gases upwardly towards the discharge pipeline 24, is that the heavier solid particles entrained in the crude gas will be acted upon by gravity and inertia and urged towards the bottom portion 22 of the hopper; while the crude gases freed of these larger particles will leave the enclosure 18 through the pipeline 24. At that point, the crude gases which have been cleaned of the larger particles via the effects of gravity and inertia and are defined as semi-scrubbed crude gases.

To avoid an excessive turbulence from forming at the bottom of hopper 22 by the crude gases emerging from diverging section 20 of collector 16 (which could cause the entrained particles which were settling or already settled on hopper 20 to be carried up again), a central deflector 26 is generally provided downstream of diverging section 20.

Solid particles collected at the bottom of hopper 22 are extracted therefrom through a lock chamber 28 consisting of two successive valves 30 and 32; and discharged by means of a transporter, such as, for example, a worm screw 34. The need for a lock chamber 28 having two valves 30 and 32 stems from the fact that, during the extraction of the deposits at the bottom of the hopper 22, there is a risk that sealing valve 30 will be unable to completely close because of the presence of solid particles on its seating.

The semi-scrubbed gases which leave unit 18 through pipeline 24 are directed into a series of scrubbers 36, which are preferably identical to each other, and therefore only one of which will be described in detail. In FIG. 1, only three such identical scrubbers 36 are shown, but it should be understood that the actual number of scrubbers utilized is generally greater, and depends on the quantity of crude gas being produced.

Each scrubber 36 incorporates therein a vertical cylinderical chamber 38 which is closed at the bottom thereof by a hopper 40 for collection of the scrubbed dust or other particles; and a device 42 for discharging these solid particles along with a lock chamber and a transporter structurally and functionally similar to the discharging system associated with primary unit 18.

Pipeline 24 is connected to each scrubber 36 via a pipeline 44 which descends downwardly into the scrubbers 36 interior to the level of hopper 40. These descending sections 44 of pipeline 24 each include a compensator 46 to permit thermal expansions, and a sealing valve 48 to disconnect the scrubber 36 automatically during cleaning, or in the event of breakdown of either the scrubber or the processing apparatus. Chamber 38 is divided by a filtration system into an upper portion and a lower portion; pipeline 44 emerging in the lower portion. This filtration system consists of a series of filtering bags 50 which are suspended from a horizontal partition 52; horizontal partition 52 separating the upper and lower portions of chamber 38. Filtering bags 50 are comprised of a suitable permeable fabric, for example, linen or fabric. The gases which enter the lower portion of chamber 38 via pipeline 44 are forced to pass through filtering bags 50 in order to reach the upper portion of chamber 38; and during the passage therethrough, the gases will be cleared (scrubbed) of the remainder of the dust and particles which are still entrained therein. The gases which have been scrubbed in the manner described above leave each of the scrubbers 36 through a discharge pipeline 54 which comprises (similar to pipelines 44), a thermal expansion compensator 56 and an automatic valve 58 for disconnection of scrubbers 36 on the downstream side thereof. Each pipeline 54 is received by a collector 60 which discharges the scrubbed gases into a unit 62. It will be appreciated that unit 62 may include a turbine and is intended to recover both the residual pressure and the temperature of the scrubbed gases, for the subsequent conversion thereof into reusable energy. Thereafter, the scrubbed, decompressed and cooled gases are then delivered into a distribution network 64.

The upper portion of each chamber 38 of each scrubber 36, in which the scrubbed gases collect, is connected through a pipeline or conduit 66 provided with a valve 68 and a compressor 70, to collector 60 for discharge of the scrubbed gases. This connection to the collector 60 permits cleaning of the filtering bags 50. For this purpose, valve 68 is opened at the required time to emit pressurized, scrubbed gases into the compressor 70 in the upper region of each chamber 38 to thereby generate a shockwave which shakes and jolts the filtering bag 50, so that the dust and other solid particles clinging to it will fall into the hopper 40. This phase of cleaning (by creating a shockwave in the opposite direction) is preceded by the automatic closing of valves 48 and 58 for the purpose of completely isolating the scrubber from the remainder of the processing apparatus. Cleaning of the scrubbers are preferably performed in cyclic fashion, to the extent that it is possible to have at least one of the scrubbers permanently in the cleaning phase.

In order that filtration through bags 50 may be performed under optimal conditions, it has been found necessary to maintain the temperature of the semi-scrubbed gases within a predetermined temperature range.

In fact, because of the material composition of bags 50, the temperature of the semi-scrubbed gases should not be too high so as not to risk causing a deterioration or degradation of the bags. It will be appreciated that synthetic fabrics usually withstand a temperature of 250°–300° C., metal filters a temperature on the order of 600° C., and finally ceramic filters a temperature on the order of 1,000° C. It will also be appreciated that ceramic filters are more expensive than metal filters which are, in turn, more expensive than filters made of fabrics. The temperature of the gases must similarly not be too low so as not to fall below the dew point, which would produce a damp soiling of the bags 50 and prevent them from being cleaned with the assistance of the gases under pressure (shock waves) provided by pipeline 60 as discussed hereinabove.

To carry out this necessary monitoring of the gas temperature, temperature measurements are performed throughout the passage of the gases. Referring again to FIG. 1, temperature measurements are taken at the top of pipelines 14, in collector 16, in collector 24 and in each scrubbers 36. The information obtained from these measurements is then transmitted to a central monitoring unit 71 (computer). When the temperature of the scrubbed gases in the scrubbers 36 becomes too high, or when any tendency of the crude gases in the top of the pipelines 14 to overheat is observed, (such that the temperature limit in the scrubbers 36 risks being exceeded), central unit 70 activates a cooling system 72. In the example shown, cooling system 72 consists of one or more spray nozzles 74 supplied by a pump 76 which sprays or sprinkles the crude gases with a cooling liquid, for example water, which then evaporates thereby absorbing the excess heat of the gases. As soon as the temperature returns to an acceptable value as a result of the sprinkling, spray nozzles 74 are shut off by the action of an automatic valve 78.

When the temperature of the scrubbed gases becomes too low, or when an excessive drop in temperature of the crude gases at the outlet of the high furnace is observed, the monitoring unit 70 automatically activates a torch 80 for heating the crude gases in the collector 16; torch 80 being automatically shut off when the crude gases are once again sufficiently hot.

While the crude gas processing apparatus in accordance with the prior art and as described in connection with FIG. 1 has the advantage of maximizing energy recovery from the crude gases released by high furnace 10, it nevertheless has the disadvantage of being relatively expensive, which diminishes its advantages in respect of energy recover and efficiency. In practice, each scrubber 36 must be equipped with separate gas pipelines 44 and 54; provided with thermal expansion compensators and sealing valves, as well as a lock chamber 42 for emptying; and a transporter for discharging the solid wastes, not to mention the structure or structures needed for supporting each of the scrubbers. Furthermore, the system for monitoring the temperature of the gases which is necessitated by the composition of the bag filters is relatively complicated, due to the complexity of the apparatus and the number of scrubbers.

Figure 2:
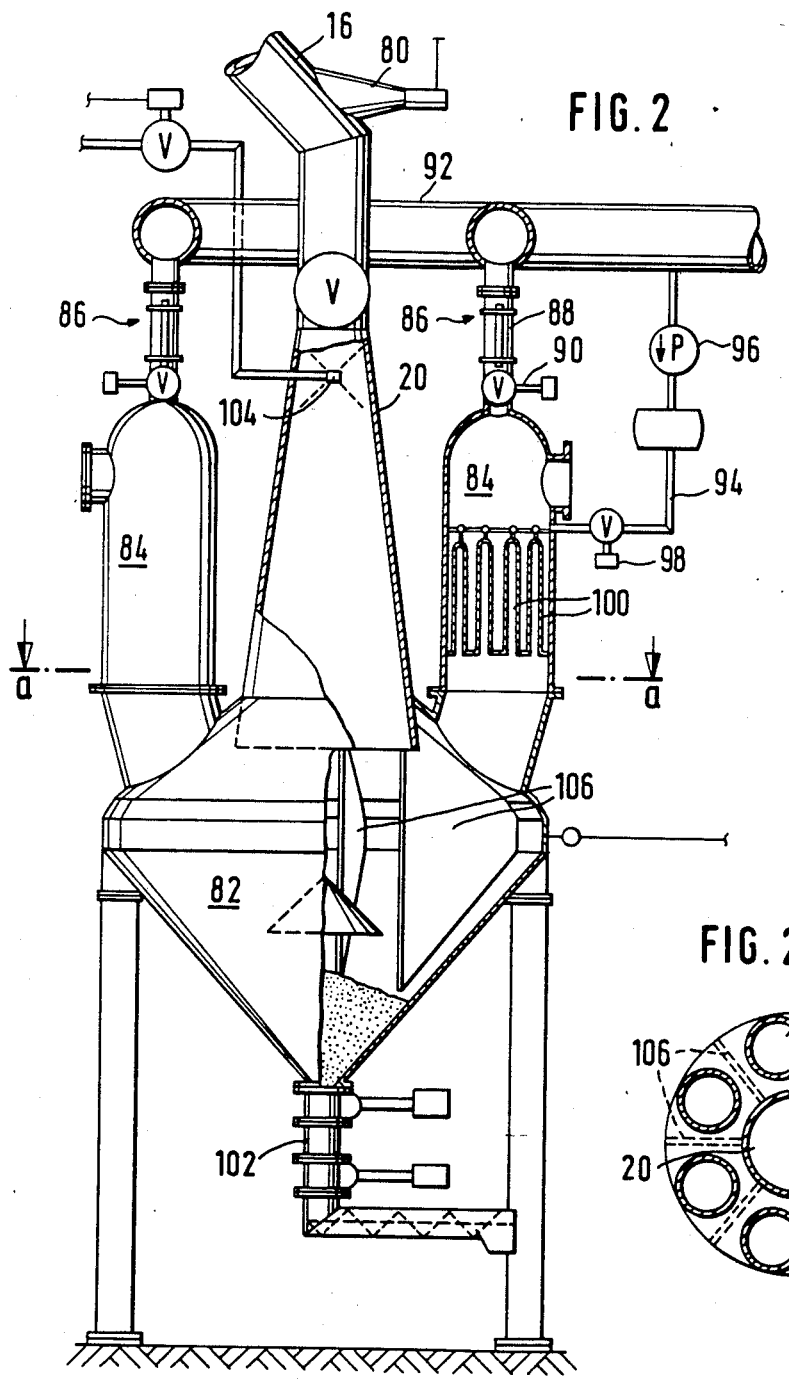
FIG. 2 is an elevation view, partly in cross-section, of a first embodiment of a contaminated gas processing and scrubbing in accordance with the present invention.

These disadvantages are eliminated or reduced by the crude gas processing and scrubbing apparatus in accordance with the present invention. Turning now to FIG. 2, a first embodiment of the present invention is shown wherein reference numerals used to designate identical elements and components are the same as those in FIG. 1.

In FIG. 2, a crude gas collector shown at 16 descends from a crude gas generator such as a high furnace (not shown), into an enclosure 82 wherein primary or initial dust removal is carried out by precipitation of the solid particles under the forces of gravity and inertia (as is the case in the apparatus described in FIG. 1). However, a significant feature of the apparatus shown in FIG. 2 is that the scrubbers 84, instead of forming separate units as in FIG. 1, are located (mounted) directly on enclosure 82, partially positioned therethrough, and radially arranged around the diverging section 20 of collector 16 (see also FIG. 2A).

Scrubbers 84 also contain a series of filtering bags 100, and are connected through the pipelines 86, each containing a compensator 88 and a valve 90, to a circular collector 92 for recovery of the scrubbed gases. Each scrubber 82 is also connected to a pipeline 94, which contains a compressor 96 and an automatic valve 98 for the purpose of blowing the pressurized, scrubbed gases into the filtering bags 100 for effecting cleaning thereof.

It will be appreciated that in the FIG. 2 scrubbers, as compared with the scrubbers in FIG. 1, the filters 100 have an opposite orientation, (i.e., whereas the gases in FIG. 1 pass through the filtering bags 50 from the exterior inwardly, in the embodiment of FIG. 2, this passage takes place from the interior outwardly). While this difference does not change any aspect of the scrubbing operation itself, the bag cleaning will no longer be performed by means of a shockwave as in the FIG. 1 apparatus, but will instead be performed with the assistance of a continuous current maintained under pressure in the opposite direction. The duration of this flushing operation is variable in accordance with the gas-dust bulk to be discharged.

As in the apparatus described in FIG. 1, scrubbers 84 may be sequentionally cleaned in rotation, and the sequences of automatic, remote-controlled openings and closings of valves and the like are similar to those described above.

The advantage of cleaning by means of a continuous current is that the gas-dust bulk can be discharged continuously during the cleaning period, and be driven back into the scrubbers which are in operation. In a preferred embodiment and to improve still further the lack of disturbance in the enclosure of unit 82, vertical partitions 106 (see also FIG. 2A) may be provided inside unit 82 between the apertures giving access to the scrubbers 84.

A means for the extraction and discharge of solid particles 102 is located at the bottom of enclosure 82. This structure collects both the particles precipitated during the primary dust removal and those retained by filtering bags 100.

The two phases of initial or primary dust removal and secondary filtration are carried out in the same manner as in the FIG. 1 apparatus, with the important difference that after the dust removal phase, the gases immediately enter the lower portion of each of the scrubbers 84 to pass through the bag filters 100.

The apparatus of the present invention consequently enables an important economic savings to be made with respect to all the pipelines in FIG. 1 which are positioned between dust removal unit 18 and each of the scrubbers 36, and likewise any associated accessory equipment such as the compensators 46 and valves 48. Furthermore, the installation in FIG. 2 requires only a single system (versus the plurality of removal systems for each scrubber in FIG. 1) for discharging the solid particles from the primary dust removal unit 82 and all the scrubbers 84. In addition, since the scrubbers are mounted directly or indirectly on the dust removal unit, it is unnecessary to provide special structures for supporting the scrubbers and it is possible to considerably reduce the bulkiness of the apparatus as a whole.

In the embodiment of FIG. 2, the cooling system (via sprinkler 104) is positioned in the collector 16 or in its diverging portion 20. The monitoring and control of this cooling system 104, as well as that of the torch 80, are carried out in the same manner as in the case of the installation of FIG. 1.

The present invention also includes the use of metal or ceramic filtering bags. While these filtering bags are more expensive than prior art fabric bags, their life is longer and, as indicated above, they withstand higher temperatures better than linen bags. The use of ceramic or metal bags may also be preferred over linen bags as the cooling system may be eliminated thereby greatly simplifying the overall apparatus.

Figures 3, 3A, 3B:
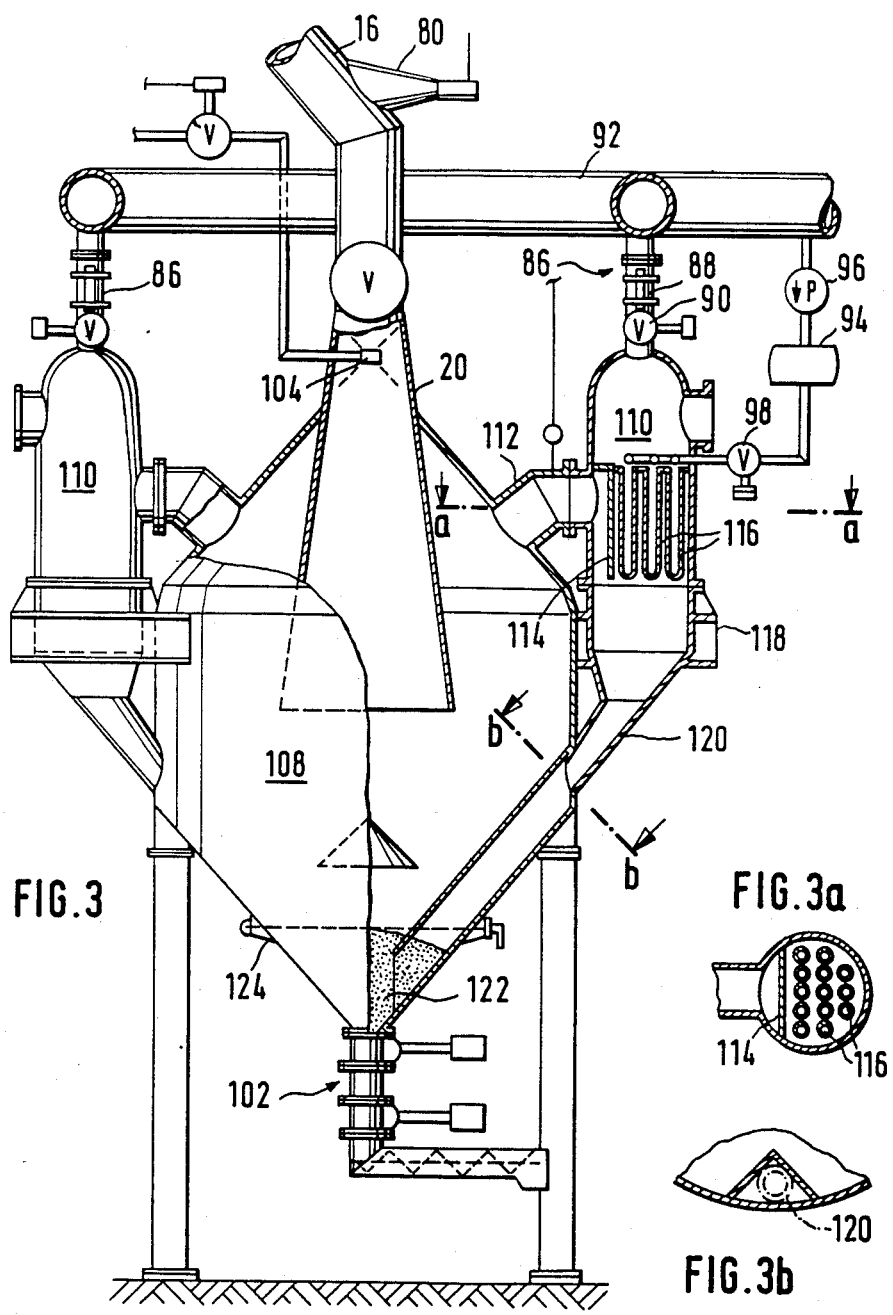
FIG. 3 is a elevation view, partly in cross-section, of a second embodiment of the contaminated gas processing and scrubbing apparatus in accordance with the present invention.
FIG. 3A is a cross-sectional elevation view along the line A—A of FIG. 3.
FIG. 3B is a cross-sectional elevation view along the line B—B of FIG. 3.

Referring now to FIG. 3, a second embodiment of an apparatus in accordance with the present invention is shown. It will be appreciated that the components which are identical to those of the first embodiment (FIG. 2) and already described above bear the same references as in FIG. 2. One of the significant differences between the embodiments of FIG. 2 and FIG. 3 is that the scrubbers 110 are no longer integrated into (i.e., partially positioned through) the wall of the primary unit 108, but are hung laterally on the periphery of unit 108, with the aid, for example, of supports 118 being welded to the wall of the primary unit 108. A series of tubular elements 112 connect the upper portion of unit 108 to each of the scrubbers 110. The gases from which dust has been removed in unit 108 directly enter the scrubbers 110 at about the center thereof and are diverted downwardly inside the latter by means of a screen 114. Thereafter, the gases will rise again to pass through the filtering bags 116 (see also FIG. 3A) and exit the apparatus via the pipelines 86 and collector 92.

It should be understood that bag filters 116 are suspended in the same manner as in the apparatus in FIG. 1. In other words, notwithstanding the alternative cleaning method of the FIG. 2 embodiment, the cleaning of the scrubbers 110 in FIG. 3 is once again accomplished with the assistance of a shockwave, by shaking the filtering bags 116 suspended in the scrubbers 110.

The scrubbing residues adhering to the filtering bags 116 fall, during the cleaning phase, into a conduit 120 which extends across the bottom of each scrubber 110 as far as the bottom of unit 108 (see also FIG. 3A). Both the initial or primary dust removal residues and those of the scrubbing are collected at the bottom of unit 108 and discharged through the lock chamber 102.

To avoid eddies in unit 108 during the cleaning of scrubbers 110; and above all to avoid the direct passage of the gases to be scrubbed from the collector 16 through the conduits 120 and into the scrubbers 110, conduit 120 is extended up to the lower portion of unit 108 so that the deposit of particular material 122 forms a natural barrier between the enclosure 108 and each of the scrubbers 110. In order to ensure this permanent closure of conduit 120, it is important that deposit 122 is always of a certain minimal height. To this end, a level detector 124 has been provided, based, for example, on radiation or other means, which automatically stops the outflow of deposit 122 when its level falls below a predetermined limit.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. In an apparatus for processing and scrubbing contaminated gases entrained with particulate matter comprising a primary dust removal unit, the primary dust removal unit comprising a walled enclosure and having means for feeding contaminated gases therein from a contaminated gas source, and wherein particulate matter is precipitated in said primary dust removal unit by gravity and/or inertia to form semi-scrubbed gas, and including a plurality of scrubbers for scrubbing the semi-scrubbed gas, each of these scrubbers containing bag filtering means which are traversed from bottom to top by the semi-scrubbed gases, the bag filtering means retaining particulate matter from the semi-scrubbed gases, wherein the improvement comprises:

said scrubbers having a top portion and a bottom portion, said scrubbers being mounted on the walled enclosure of said primary dust removal unit, at least a portion of each of said scrubbers being exterior of said primary dust removal unit;

circular conduit means being connected to said top portion of said scrubbers to collect the scrubbed gas;

hopper means forming the base of said primary dust removal unit and communicating with said scrubbers;

said contaminated gas feeding means including a diverging end portion which communicates with said walled enclosure of said primary dust removal unit, said diverging end portion decelerating said contaminated gases;

said scrubbers being arranged radially about said diverging end portion and about said walled enclosure;

means for deviating the semi-scrubbed gases upwardly from said hopper means to said scrubbers; the decelerated and deviated gases precipitating particulate matter into the primary dust removal unit; and wherein the particulate matter precipitated in the primary dust removal unit and the particulate matter retained in the bag filter means are all collected by and discharged through said hopper means.

2. The apparatus of claim 1 including:
means for monitoring the temperature of the contaminated gases.

3. The apparatus of claim 1 including:
means for cooling or heating the contaminated gases in order to maintain their temperature within predetermined operational limits.

4. The apparatus of claim 1 wherein:

a portion of said scrubbers are positioned through the walled enclosure of said primary dust removal unit to define access openings between each scrubber interior and said walled enclosure.

5. The apparatus of claim 4 including:

partition means mounted in the interior of said primary dust removal unit enclosure, said partition means located between adjoining access openings of adjoining scrubbers.

6. The apparatus of claim 1 including:

tubular element means connected between each of said scrubbers and said primary dust removal unit wherein said semi-scrubbed gases are transferred from said primary dust removal unit to each of said scrubbers through said tubular element means; and conduit means connected between each of said scrubbers and said primary dust removal unit wherein said particulate matter retained in the bag filtering means is transfered through said conduit means to said hopper means.

7. The apparatus of claim 5 wherein:

the bottom of said hopper is adapted to retain a deposit of particulate matter and maintain the deposit at a preselected deposit level; and said conduit means terminates at said hopper bottom below the preselected deposit level.

8. The apparatus of claim 7 including:

level detector means for maintaining said deposit at said preselected deposit level.

9. The apparatus of claim 5 including:

screen means in each of said scrubbers and disposed across from said tubular element means wherein the semi-scrubbed gases delivered by said tubular element means are diverted downwardly by said screen means.

10. The apparatus of claim 1 wherein:

said bag filtering means includes a bottom and a top; and wherein said bag filtering means are suspended in said scrubbers with the bottoms thereof facing downwardly.

11. The apparatus of claim 5 wherein:

said bag filtering means includes a bottom and a top; and wherein said bag filtering means are suspended in said scrubbers with the bottoms thereof facing downwardly.

12. The apparatus of claim 1 wherein:

said bag filtering means includes a bottom and a top; and wherein said bag filtering means are suspended in said scrubbers with the bottoms thereof facing upwardly.

13. The apparatus of claim 4 wherein:

said bag filtering means includes a bottom and a top; and wherein said bag filtering means are suspended in said scrubbers with the bottoms thereof facing upwardly.

14. The apparatus of claim 1 wherein:

said filtering bag means are metal filtering bag means.

15. The apparatus of claim 1 wherein:

said filtering bag means are ceramic filtering bag means.

16. The apparatus of claim 1 including:

means for cleaning said filtering bag means.

* * * * *